United States Patent
Laing et al.

(10) Patent No.: US 6,713,925 B2
(45) Date of Patent: Mar. 30, 2004

(54) ELECTRIC MOTOR WITH REDUCED AXIAL LENGTH

(76) Inventors: Karsten A. Laing, 1253 La Jolla Rancho Rd., La Jolla, CA (US) 92037; Nikolaus J. Laing, 1235 La Jolla Rancho Rd., La Jolla, CA (US) 92037; Zoltan Jagasics, Dozsa Gy. u. 1-3 VL/47, Gögöllö H2100 (HU)

( * ) Notice: Subject to any disclaimer, the term of this patent is extended or adjusted under 35 U.S.C. 154(b) by 0 days.

(21) Appl. No.: 10/152,271

(22) Filed: May 20, 2002

(65) Prior Publication Data

US 2003/0214195 A1 Nov. 20, 2003

(51) Int. Cl.$^7$ ................................................. H02K 7/08
(52) U.S. Cl. ........................ 310/179; 310/90; 310/154
(58) Field of Search .................... 310/179, 90

(56) References Cited

U.S. PATENT DOCUMENTS

| | | | | |
|---|---|---|---|---|
| 3,803,432 A | * | 4/1974 | Laing | 310/90 |
| 4,421,464 A | * | 12/1983 | Schmidt | 417/412 |
| 4,658,166 A | | 4/1987 | Oudet | |
| 4,682,067 A | | 7/1987 | Oudet | |
| 4,866,323 A | | 9/1989 | Oudet et al. | |
| 5,481,151 A | * | 1/1996 | Stacy | 310/90 |

FOREIGN PATENT DOCUMENTS

| | | |
|---|---|---|
| DE | 45808 | 6/1887 |
| DE | 78075 | 5/1893 |

OTHER PUBLICATIONS

Minimotor SA Product Design Web Page Mar. 2, 2002 Minimotro SA, Switzerland.
The New Quantum Leap in Motor Technology: "Ferrous Loss–Free".

* cited by examiner

Primary Examiner—Nestor Ramirez
Assistant Examiner—Iraj A. Mohandesi
(74) Attorney, Agent, or Firm—Foley & Lardner

(57) ABSTRACT

A compact electrical motor, particularly adapted to act as the driving component of a centrifugal pump, has a hemispherical rotor mounting the impeller and comprising at least two permanent magnetic poles. A thin, waterproof and static septum intimately surrounds the rotor. A circular stator includes a bowl-shaped yoke and a winding applied to the inner surface of the yoke and comprising segments running in successive, alternate sections obliquely to the motor's axis of rotation between the upper and lower rim of the yoke. The successive foldings of the strands about the upper and lower rim of the yoke substantially eliminates the electro-mechanically inactive and power-dissipating portions of the stator or winding found in motors of the prior art.

18 Claims, 5 Drawing Sheets

ELECTRIC MOTOR WITH REDUCED AXIAL LENGTH

FIELD OF THE INVENTION

This invention relates to electrical power machinery and, more particularly, to electrical motors or generators having a reduced axial length such as those used as driving components in centrifugal pumps.

BACKGROUND OF THE INVENTION

Most electrical motors of the prior art include yoke and soft magnetic stators sections that penetrate the windings. These sections are magnetically inactive and contribute to power losses, and excessive size and weight.

The instant invention results from an attempt to provide efficient electrical motor elements, such as those used in centrifugal pumps, that require short axial lengths.

SUMMARY OF THE INVENTION

The principal and secondary objects of this invention are to provide efficient and compact electrical power machines having no magnetically inactive winding portions and a relatively short axial length. Electrical motors of this type can be effectively used as the driving components of centrifugal pumps.

These and other valuable objects are achieved by using a magnetized rotor preferably having a spherical shape.

The matching bowl-shaped stator comprises a circular yoke concentrically surrounding the rotor and a winding consisting of a plurality of segments mounted against the inner wall of the yoke in alternating sequences and obliquely oriented segments in relation to the motor axis of rotation. The yoke is preferably made of a composite of particles of ferro-magnetic material each coated with an electrically non-conductive layer.

In the preferred embodiment of the invention, a waterproof septum is installed in the air gap between the rotor and the soft magnetic yoke so that the rotor can be integrally formed with the impeller and immersed in the pump fluid.

While the spherical configuration of the motor yield the most efficient short axis machine, a frusto-conical or even cylindrical configuration may be chosen for ease of fabrication while retaining the principal advantages of the invention.

The inner surface of the yoke against which the winding is mounted is concentric with the motor axis of rotation but not necessarily parallel to it as it is in a cylindrical version. That inner surface may be axially linear as in a cylindrical or frusto-conical design or non-linear, that is, arcuate or in a complex broken line configuration.

The same efficient configurations can be advantageously applied to the design and construction of other electrical machines such as generators as well as electro-magnetic instruments such as compasses, galvanometers and any other devices that include electro-magnets.

DESCRIPTION OF THE PREFERRED EMBODIMENT OF THE INVENTION

Figure 1:
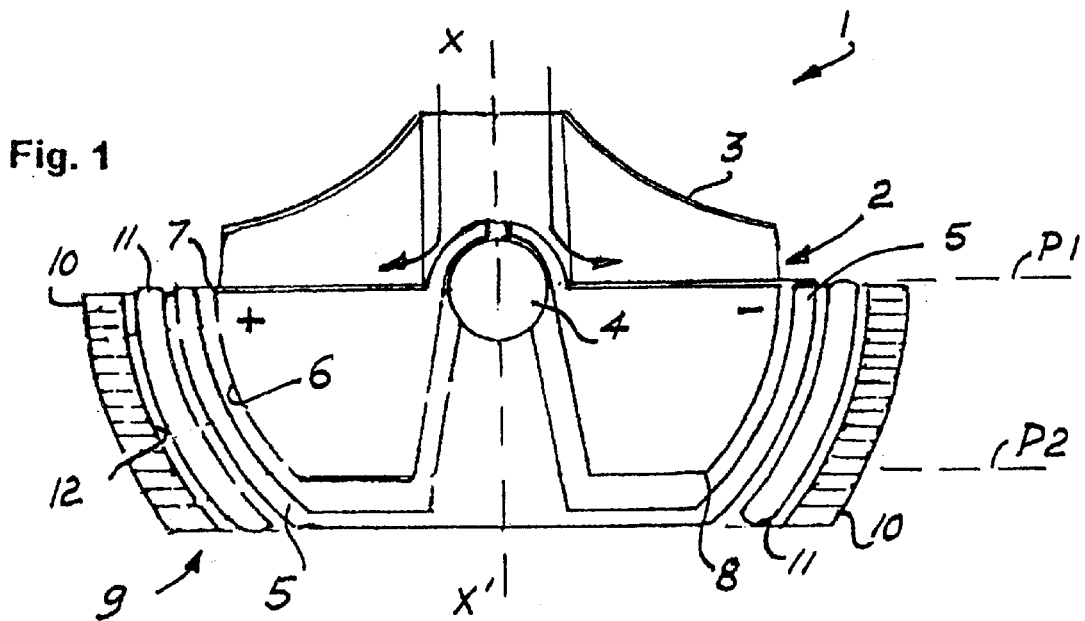
FIG. 1 is a cross-sectional view of the impeller and motor-driving portion of a centrifugal pump according to the invention.

Referring now to the drawing, there is shown in FIG. 1, an impeller and rotor portion 1 of motor for a centrifugal pump according to the invention. The flow of the pumped fluid is indicated by arrows. The rotor 2 which mounts the impeller 3 is balanced on a spherical-bearing 4, consisting of a ball and cap structure, inside a waterproof enclosure which includes a septum 5 running closely to the outer face 6 of the rotor. The septum is preferably thin and made from electrically non-conductive organic material, e.g., a thermoplastic, in order to eliminate EDDY-current losses. The rotor is formed by a permanent magnet. The outer face 6 of the rotor defines a spherical sector between two parallel planes P1 and P2 perpendicular to the motor axis of rotation X–X'. The upper rim 7 and lower rim 8 of the rotor lie within planes P1 and P2 respectively.

The stator 9 concentrically surrounds the septum 5 and rotor 2. The stator comprises a soft magnetic yoke 10 and a winding 11 applied against the inner surface 12 of the yoke. That inner surface and the winding mirror the spherical shape of the rotor outer face 6. The yoke is preferably made of insulation-coated soft ferro-magnetic particles.

If the motor is to be powered by an AC source, the rotor comprises a permanent magnet having a relatively low coercive force but high electrical conductivity.

Figure 2:
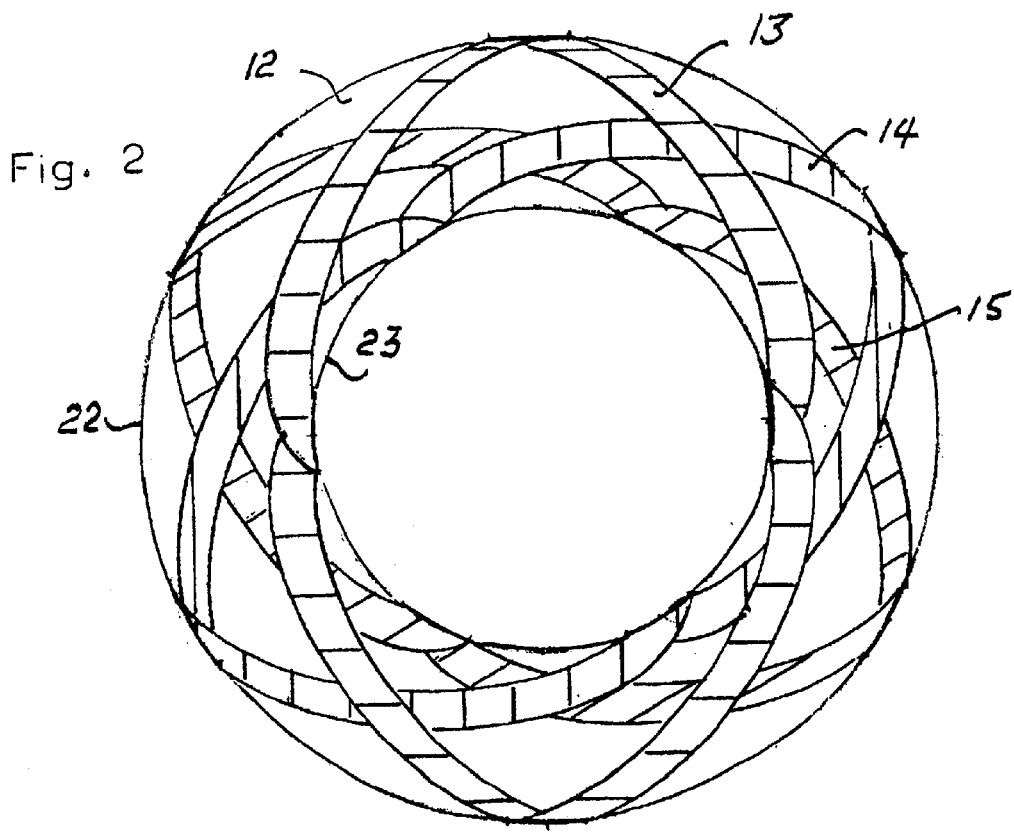
FIG. 2 is a top plan view of the stator with a three-phase, two-pole winding.
Figure 3:
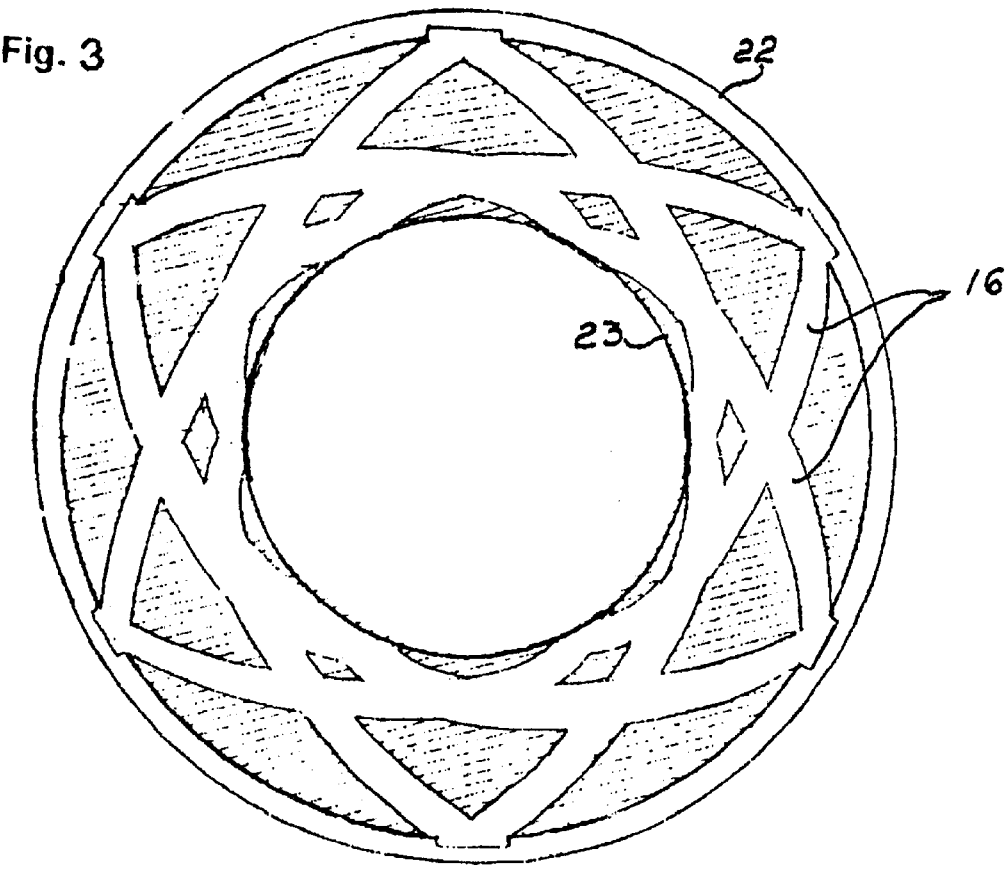
FIG. 3 is a top plan view of the yoke.

The winding 11 is divided into three separate phases 13, 14, 15 laid over the entire inner surface 12 of the yoke as illustrated in FIG. 2. Each phase of the winding consists of a multi-turn loop of wire folded into the saw-tooth configuration as will be explained below. The winding is preferably nested into a pattern of grooves 16 formed into the inner surface of the yoke as illustrated in FIG. 3.

Figure 4A:
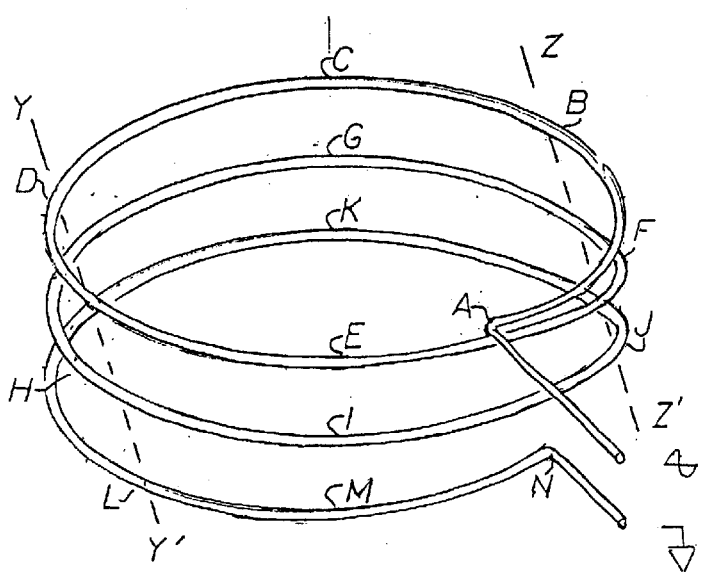
FIGS. 4a–4d are diagrammatical illustrations of a first winding fabrication.

Each phase winding is preferably made according to the steps illustrated in FIGS. 4a–4d where letter references A–N are used along every quadrant of each loop to indicate corresondence between the various views. First, a length of insulated wire 17 is coiled into an helix 18 as shown in FIG. 4a. For the sake of drawing clarity, only three spaced-apart turns are shown. In practice, a large number of turns are used, and each turn is preferably glued to the adjacent ones in order to form a loop in the form of a shallow cylinder with a ribbon-like wall. The diameter of the loop should be slightly larger than the diameter of the upper and larger rim 22 at the inner surface of the yoke.

Figure 4B:
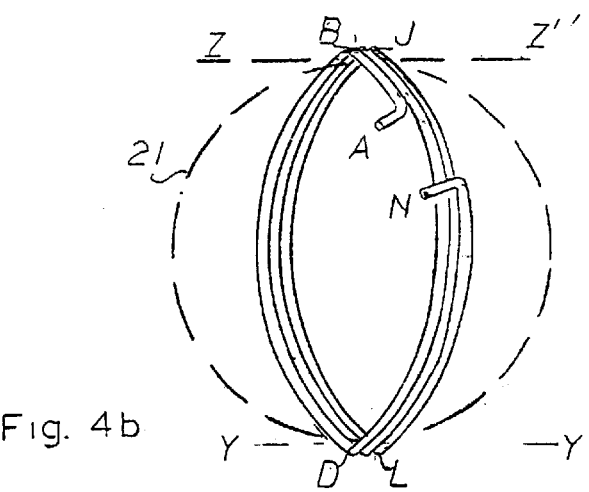
Figure 4C:
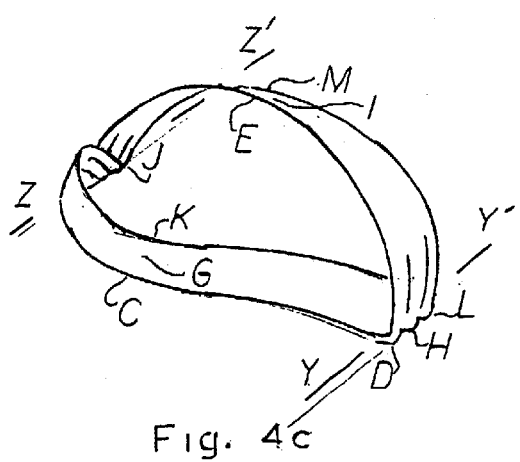
Figure 4D:
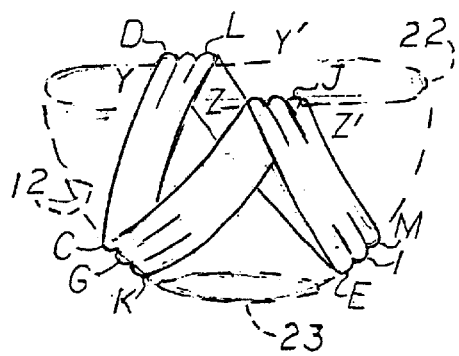

Next, the helix or loop 18 is folded, one half against the other half, but about two diametrically opposite axis Y–Y' and Z–Z' which are parallel to each other and oblique to the axis of the loop as illustrated in FIGS. 4a and 4b. The winding now assumes the shape of two arches with common roots but spaced-apart apices as shown in FIGS. 4b and 4c. The apex regions C, G, K, and EIM of the loops have the cross-sections that run obliquely to the Y–Y' and Z–Z' axes, and closely match the axial curvature of the yoke inner surface 12. The winding can now be dropped into the ball-shaped yoke and each segment can be pushed into its corresponding groove 16 cut into the inner surface of the yoke. When folding the loop, care should be taken to bring the two axes Y–Y' and Z–Z' to a distance slightly shorter than the diameter of a circle 21 corresponding to the largest, upper rim 22 of the yoke. The winding extends across the entire width of the inner surface of the yoke, that is from the upper rim 22 to the lower and smallest rim 23. These rims preferably lie in the two planes P1 and P2.

Figure 5:
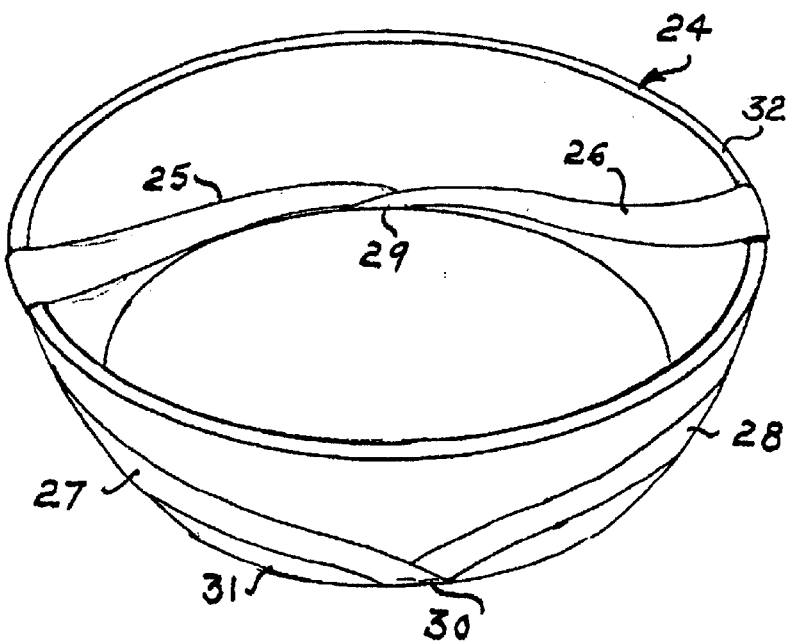
FIG. 5 is a perspective view of a first alternate winding configuration.

In the alternate embodiment of the winding 11 illustrated in FIG. 5, the helix or coil is wrapped around a thin circular frame 24 having the shape of a spherical sector. The frame is shaped and dimensioned to fit snugly against the inner surface of the yoke. The position and oblique orientation of the various segments 25, 26, 27, 28 are basically similar to the one in the earliest described embodiment of the winding. However, the two lower portions 29, 30, are folded upon themselves near the smallest edge 31 of the frame 24, so that the coil is folded into four segments. It should be noted that the winding is not wound through the frame but only folded over its upper edge 32 and along the lower edge 31. No part of the winding passes below the bottom edge 31. Two segments 25,26 are laid against the inner wall of the frame, while the other two segments 27, 28 are laid against its outer wall.

Alternately, the winding can be wound around the frame during its construction, and be folded over both the upper and lower edges of the frame.

Figure 6:
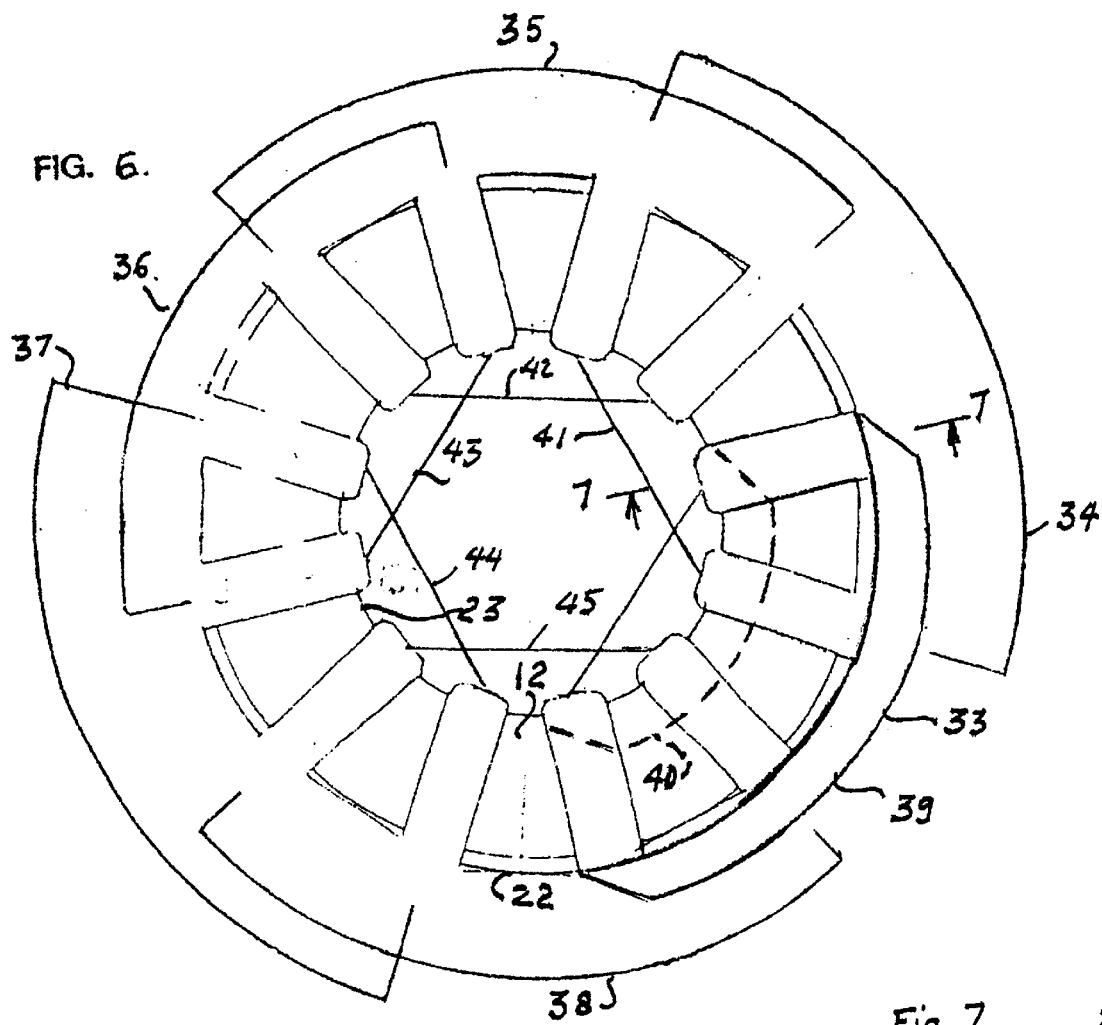
FIG. 6 is a top plan view of a stator with a second alternate embodiment of the winding.
Figure 8:
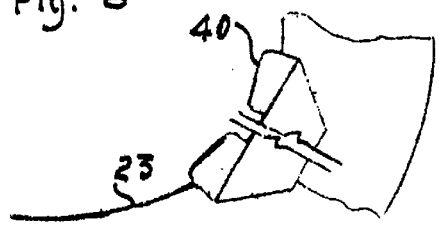
FIG. 8 is a bottom plan view of a lower winding connection.
Figure 7:
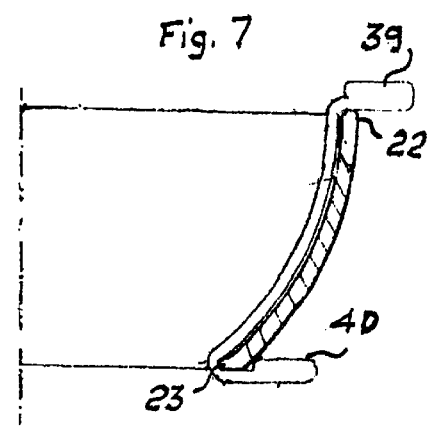
FIG. 7 is a partial cross-sectional view taken along line 7—7 of FIG. 6.

In a second alternate embodiment of the winding illustrated in FIGS. 6–8, helicoidal wire loops 33–38 are laid against the inside surface 12 of the yoke 10 in a side-by-side, three-phase configuration. A top portion 39 of each loop is folded in a trapezoidal arrangement and bent over the largest rim 22 of the yoke. A lower portion 40 of each loop is similarly folded in another trapezoidal arrangement and folded over the smallest rim of the yoke. The six loops are configured to form a three-phase, four-pole stator winding. Only one loop 33 is completely shown in the drawing. Lines 34–38 and 41–45 are used to indicate the paths of the other five loops.

It should be understood that other types of motors can be implemented using either one of the three types of windings. For instance, in a two-phase motor using the winding configurations such as the one illustrated in FIG. 6, could be implemented with a number of loops divisible by 4.

Figure 9:
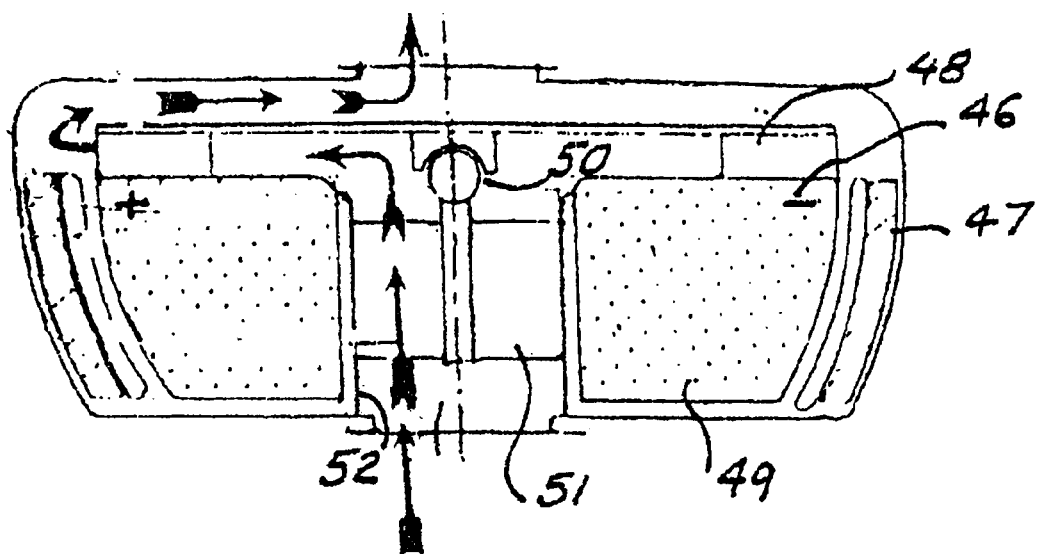
FIG. 9 is a cross-sectional view of an alternate embodiment of the pump.

In the alternate embodiment of the pump illustrated in FIG. 9, no septum separates the rotor 46 from the stator 47. Both are in contact with the fluid whose flow is indicated by arrows. The electrical components are the same as the ones described previously. The impeller 48 is attached to the rotor 46 including the multipole permanent magnet 49. The spherical-bearing 50 is supported by a series of vanes 51 positioned within the intake channel 52. It should be understood that this type of pump could not be used to move an electrically conductive fluid.

While the preferred embodiments of the invention have been described, modifications can be made and other embodiments may be devised without departing from the spirit of the invention and the scope of the appended claims.

What is claimed is:

1. An electro-mechanical device having an axis of rotation, said machine comprising:
    a rotor having a plurality of permanent magnetic poles, an outer face, a given axial length, and first and second axially opposite rims;
    a stator concentrically surrounding said rotor and including:
        a soft magnetic yoke having an inner surface parallel to and spaced apart from the outer face of the rotor; and
        at least one continuous multi-pole winding applied to said inner surface, said winding covering an axial length substantially similar to an axial length of said outer face; and
    wherein said outer face and inner surface are not parallel to said axis of rotation.

2. The device of claim 1, wherein said outer face and inner surface are axially non-linear.

3. The device of claim 2, wherein said outer face and inner surface are axially arcuate.

4. The device of claim 3, wherein said outer face and inner surface define spherical sectors limited by first and second parallel planes perpendicular to said axis of rotation.

5. The device of claim 1, wherein said yoke and said winding have substantially equal axial lengths.

6. The device of claim 1, wherein said yoke comprises particles of ferro-magnetic material coated with an electrically non-conductive substance.

7. The device of claim 4, wherein said yoke comprises particles of ferromagnetic material coated with an electrically non-conductive substance;
    the inner surface of the yoke has an axial length substantially equal to the axial length of the rotor and said winding extend over said entire inner surface.

8. An electro-mechanical device having an axis of rotation, said machine comprising:
    a rotor having a plurality of permanent magnetic poles, an outer face, a given axial length, and first and second axially opposite rims;
    a stator concentrically surrounding said rotor and including:
        a soft magnetic yoke having an inner surface parallel to and spaced apart from the outer face of the rotor; and
        at least one continuous multi-pole winding applied to said inner surface, said winding comprising a plurality of segments running in alternating directions; and
    wherein said outer face and inner surface are not parallel to said axis of rotation; and,
    wherein said winding comprises:
        at least one insulated conductor wound into a helicoidal multi-turn loop of a given width, said loop being folded at two diametrically opposite locations about a pair of parallel axes to form two substantially symmetrical arches;
        whereby said winding defines a substantially frustroconical structure;
    said device being shaped and dimensioned to intimately contact the inner surface of the yoke.

9. The device of claim 8, wherein the inner surface of the yoke comprises a pattern of grooves shaped and dimensioned to nest said winding.

10. The device of claim 1, wherein the inner surface of the stator has an axial length substantially equal to the axial length of the rotor and said winding extends over said entire inner surface.

11. The device of claim 1, wherein said segments run obliquely to the axis of rotation.

12. The device of claim 1, wherein said winding comprises at least one insulated conductor wrapped over a circular frame shaped and dimensioned to run concentrically to and between said inner surface and outer face.

13. The device of claim 1, wherein said rotor comprises a permanent magnet having high electrical conductivity.

14. The device of claim 1, wherein said rotor is associated with a pump impeller.

15. The device of claim 14, which further comprises a watertight septum shaped and dimensioned to lie between said rotor and said stator whereby said stator is insulated from any fluid moved by said pump.

16. The device of claim 15, wherein said septum is made of electrically non-conductive material.

17. The device of claim 1, wherein said winding comprises a plurality of segments running in alternating directions.

18. An electro-mechanical device having an axis of rotation, said machine comprising:

a rotor having a plurality of permanent magnetic poles and an outer surface;

a stator concentrically surrounding said rotor and having an inner surface parallel to and spaced apart from the outer face of the rotor; and at least one winding applied to said inner surface facing said outer surface of said rotor;

wherein said outer face and inner surface are not parallel to said axis of rotation;

wherein said stator and said rotor have substantially identical axial lengths.

* * * * *